United States Patent
Novack et al.

(10) Patent No.: US 6,272,886 B1
(45) Date of Patent: Aug. 14, 2001

(54) INCREMENTAL METHOD OF PRODUCING MULTIPLE UV-INDUCED GRATINGS ON A SINGLE OPTICAL FIBER

(75) Inventors: James C. Novack; Bryon J. Cronk, both of Hudson, WI (US); Bruce A. Rabine, Oakdale, MN (US); Gary A. Ball; Harmeet Singh, both of Simsbury, CT (US); Paul E. Sanders, Madison, CT (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 08/735,468

(22) Filed: Oct. 23, 1996

(51) Int. Cl.[7] ................................................. C03B 37/10
(52) U.S. Cl. ................................. 65/387; 65/392; 65/425; 430/290; 430/321
(58) Field of Search .......................... 65/392, 425, 387; 430/290, 321

(56) References Cited

U.S. PATENT DOCUMENTS

| | | | |
|---|---|---|---|
| 4,566,889 | 1/1986 | Schmadel, Jr. | 65/3.2 |
| 4,593,969 | 6/1986 | Goodman et al. | 350/96.19 |
| 4,629,285 | 12/1986 | Carter et al. | 350/96.23 |
| 4,725,110 | 2/1988 | Glenn et al. | 350/3.61 |
| 4,807,950 | 2/1989 | Glenn et al. | 350/3.61 |
| 4,957,343 | 9/1990 | Sato et al. | 350/96.21 |
| 4,986,843 | 1/1991 | Itoh et al. | 65/152 |
| 5,013,345 | 5/1991 | Itoh et al. | 65/4.2 |
| 5,060,133 | * 10/1991 | Brienza . | |
| 5,147,434 | 9/1992 | Itoh et al. | 65/12 |
| 5,327,515 | * 7/1994 | Anderson | 385/123 |
| 5,354,348 | * 10/1994 | Zuchi | 65/423 |
| 5,384,884 | 1/1995 | Kashyap et al. | 385/129 |
| 5,400,422 | * 3/1995 | Askins | 385/37 |
| 5,422,745 | 6/1995 | Williams et al. | 359/3 |
| 5,572,609 | * 11/1996 | Li . | |
| 5,596,669 | 1/1997 | Murphy et al. | 385/128 |
| 5,620,495 | * 4/1997 | Aspell | 65/625 |
| 5,620,496 | * 4/1997 | Erdogan | 65/425 |
| 5,745,615 | * 4/1998 | Atkins | 65/425 |

FOREIGN PATENT DOCUMENTS

| | | |
|---|---|---|
| 41 40 087 A1 | 9/1993 | (DE) . |
| 0 715 193 A1 | 6/1990 | (EP) . |
| 0 736 783 A2 | 10/1990 | (EP) . |
| 1024861 | 6/1983 | (RU) .............. G02B/5/16 |

OTHER PUBLICATIONS

Bryon, K.C. et al., "Fabrication of Chirped Fibre Gratings by Novel Stretch and Write Technique," *Electronic Letters*, vol. 31, No. 1, pp. 60–1 (Jan. 5, 1995).

(List continued on next page.)

*Primary Examiner*—John Hoffmann
(74) *Attorney, Agent, or Firm*—Nestor F. Ho; H. Sanders Gwin, Jr.

(57) ABSTRACT

The present invention is a process for manufacturing an optical fiber Bragg grating, which in a preferred embodiment includes the steps of: (a) removing at least a portion of a removable coating on an optical fiber element in at least one predetermined section to sufficiently expose the optical fiber in the section for a subsequent treatment by a source of optical radiation; (b) fixing the at least one section with respect to the source of optical radiation; (c) directing optical radiation from the source into the optical fiber to produce at least one Bragg grating in the at least one section; and (d) covering the at least one section. The present invention also extends to an apparatus for carrying out the process steps described above, which includes means for coating removal, means for fiber immobilization, means for writing a Bragg grating, and means for packaging.

6 Claims, 3 Drawing Sheets

OTHER PUBLICATIONS

Campbell, R.J. et al., "Spectral Profile and Multiplexing of Bragg Gratings in Photosensitive Fiber," *Optics Letters*, vol. 16, No. 12, pp. 898–900 (Jun. 15, 1991).

Erdogan, T. et al., "Decay of Ultraviolet–Induced Fiber Bragg Gratings," *J. Appl. Phys.*, vol. 76, No. 1, pp. 73–80 (Jul. 1, 1994).

Farries, M.C. et al., "Fabrication and Performance of Packaged Fiber Gratings for Telecommunications," *The Institute of Electrical Engineers, Optical Fiber Gratings and Their Applications* (Jan. 1995).

Meltz et al., "Formation of Bragg Gratings in Optical Fibers by a Transverse Holographic Method," *Opt. Lett.*, 14, pp. 823–825 (1989).

Morey W. et al., "Photoinduced Bragg Gratings in Optical Fibers," *Optics & Photonics News*, vol. 5, No. 2, pp. 8–14 (Feb. 1994).

Rizvi et al., "Production of Bragg Gratings in Optical Fibers by Holographic and Mask Production Methods," *The Institute of Electrical Engineers, Optical Fiber Gratings and Their Applications*, (Jan. 1995).

Sterling, *Technicians's Guide to Fiber Optics*, p. 73 (1993).

Tang et al., "Annealing of Linear Birefringence in Single–Mode Fiber Coils: Applications to Optical Fiber Current Sensors," *Journal of Lightwave Technology*, vol. 9, No. 8, pp. 1031–7 (Aug. 1991).

Zhang, Q. et al., "Tuning Bragg Wavelength by Writing Gratings on Prestrained Fibers," *IEEE Photonics Tech. Letters*, vol. 6, No. 7, pp. 839–841 (Jul. 1994).

M. C. Farries et al., of GEC Marconi Materials Technology, Caswell; Aston University, Birmingham; "*Fabrication and Performance of Packaged Fibre–gratings for Telecommunications*", in 1995 IEE, London, XP 000672401, pp. 4/1–4/5.

* cited by examiner

INCREMENTAL METHOD OF PRODUCING MULTIPLE UV-INDUCED GRATINGS ON A SINGLE OPTICAL FIBER

BACKGROUND OF THE INVENTION

1. Field of the Invention

The present invention relates to an apparatus and process for forming a Bragg grating in an optical fiber element. More particularly, the present invention relates to an apparatus and a continuous or stepwise continuous process for making optical fiber Bragg gratings in a coated optical fiber element. In a presently preferred embodiment, the process of the present invention includes the steps of removing a sufficient amount of a removable coating from at least one predetermined section of an optical fiber element such that optical radiation may access a core of the optical fiber, immobilizing the predetermined section of the optical fiber, forming at least one Bragg grating in the predetermined section of the optical fiber, and treating the predetermined section of the optical fiber to package the Bragg grating.

2. Description of Related Art

A Bragg diffraction grating is a structure that has a periodic pattern of alternating high and low optical refractive index values. Bragg gratings are useful because of their ability to reflect a particular wavelength or "color" of light. The color that will be reflected by a grating is the color whose wavelength exactly matches twice the effective grating period. See, for example, Morey et al., *Photoinduced Bragg Gratings in Optical Fibers*, Optics and Photonics News, vol. 5, no. 2 (February 1994); Meltz et al., *Formation of Bragg Gratings in Optical Fibers by a Transverse Holographic Method*, Opt. Lett. 14 (1989) at 823–25.

It is well known that Bragg gratings may be formed by creating an interference pattern in the germanosilicate glass core of an optical fiber, typically by recombining two parts of the beam of an ultraviolet laser. The first optical fiber Bragg gratings were produced accidentally when an argon ion laser remained focused into the end of an optical fiber for a period of hours. A portion of the beam was reflected back upon itself in the fiber, producing a standing wave interference pattern. In the bright sections of the interference pattern (where the forward- and backward-traveling waves reinforce each other), the laser light interacted with germanium sites in the fiber core and changed the local refractive index. At the dark sections of the interference pattern (where the two waves destructively interfere and cancel each other), the refractive index remained unchanged.

However, this "end launch" method of "writing" Bragg gratings in optical fibers allows almost no control of the location of the grating within the fiber, the angle of the grating planes with respect to the optical fiber axis, or the grating period. All of these variables are important to control when constructing useful devices based on fiber optic Bragg gratings, and the end launch method has not proved useful for producing optical fiber Bragg gratings in commercial quantities.

To provide greater flexibility in the design of fiber optic Bragg grating devices, techniques have been developed to write gratings by applying optical radiation through the side of (e.g. normal to the length of) an optical fiber. One such technique, as illustrated in U.S. Pat. Nos. 4,725,110 and 4,807,950, involves splitting a laser beam into two sub-beams and recombining these sub-beams at a known and controllable angle within the core of the optical fiber. A second well-known technique described in the technical and patent literature involves focusing the laser beam on the fiber core through a grooved or patterned transmissive optical element known as a phase mask. This phase mask holographically creates an interference pattern in the optical fiber core.

The above-described techniques for producing optical fiber Bragg gratings are well established, but certain technical difficulties to date have prevented their use in large scale continuous or stepwise continuous production processes. For example, a significant production problem is removal of the coating which covers the section of the optical fiber to be treated with the laser. Optical fibers are produced with a coating which protects the delicate glass structure from chemical or mechanical attack, and this coating must be substantially completely removed if the applied optical radiation is to access and form a Bragg grating in the optical fiber core. If a coated optical fiber is to be used in the manufacture of a fiber Bragg grating, it is necessary first to thermally, chemically or mechanically remove all or a part of the protective coating from the coated optical fiber to leave an optically treatable, preferably bare, fiber surface. See, for example, Rizvi and Gower, *Production of Bragg Gratings in Optical Fibers by Holographic and Mask Production Methods*, The Institute of Electrical Engineers, Optical Fiber Gratings and Their Applications, January 1995.

However, conventional thermal, mechanical or chemical means for stripping the coating from the bare fiber in manufacturing processes are time consuming and reduce the physical integrity of the fiber. See, e.g., M. C. Farries et al., *Fabrication and Performance of Packaged Fiber Gratings for Telecommunications*, The Institute of Electrical Engineers, Optical Fiber Gratings and Their Applications, January 1995; Tang et al., *Annealing of Linear Birefringence in Single-Mode Fiber Coils: Application to Optical Fiber Current Sensors*, Journal of Lightwave Technology, vol. 9, No 8, August 1991. Therefore, careful removal of the optical fiber coating is required to form a sufficiently clean glass surface to allow treatment of the optical fiber core with the laser, as well as an optical fiber which retains its strength after formation of the Bragg grating in the core. Time-consuming and labor intensive coating removal steps have to date limited manufacture of optical fiber Bragg gratings to production in small batches. In these batch processes the coating is typically chemically removed from a short length (referred to herein as a "section") of several optical fibers. The fibers are then treated, one at a time, with a laser using a phase mask projection technique to form Bragg gratings in the sections of the optical fibers where the coating was removed. These production processes provide good control over formation of a single Bragg grating in a short length of optical fiber. However, the batch technique is obviously not economically feasible for large scale Bragg grating production, or for production of multiple Bragg gratings in a long length of optical fiber for grating arrays. In addition, in the batch technique the bare optical fiber is exposed for significant lengths of time, which may degrade fiber strength. To monitor grating quality, the batch technique requires a termination for each optical fiber end.

To address the coating removal problems in the batch production technique, some optical fiber Bragg gratings have been written as the optical fiber is produced on the draw tower. Draw tower production makes coating removal unnecessary, since the optical fiber cores are treated with optical radiation to form Bragg gratings before their protective coating(s) is applied. Formation of Bragg gratings during fiber draw increases production volume compared to the batch process described above. However, as the optical fibers are drawn on the draw tower, the Bragg gratings must be formed with a single shot from the laser, and the draw process cannot be stopped or interrupted to use different grating writing techniques. Further, the Bragg condition (for example, center band wavelength) of the Bragg grating depends on the exact placement of a predetermined section of the optical fiber relative to a writing zone, and since the position of the optical fiber drawn on the tower cannot be precisely controlled, the grating writing process cannot be sufficiently stable from shot to shot. The variation in draw speed also makes precise location of the Bragg grating difficult. Therefore, while the draw tower production technique increases production speed compared to the batch process, this speed comes at a significant cost in grating quality and precision.

To date, no apparatus or process for the large scale manufacture of optical fiber Bragg gratings has been identified which provides production speed and efficiency, ensures grating quality, and maintains optical fiber strength following grating formation.

SUMMARY OF THE INVENTION

The present invention is a stepwise continuous process for the manufacture of optical fiber Bragg gratings which provides the speed of draw tower production processes as well as the control over grating quality available from small scale batch processes. The process of the present invention decouples the optical fiber draw process from the grating writing process and provides an efficient and economical off-line method for producing Bragg gratings in coated optical fibers.

In a presently preferred embodiment, the present invention is a process for manufacturing an optical fiber Bragg grating, which comprises the following steps:

(a) removing at least a portion of a removable coating in at least one predetermined section of the element to sufficiently expose an optical fiber in the section for subsequent treatment with a source of optical radiation;

(b) fixing the at least one section with respect to the source of optical radiation;

(c) directing optical radiation from the source into the at least one section to produce a Bragg grating therein; and (d) covering the at least one section.

In step (a), a glass optical fiber element of any diameter or shape may be provided for processing. The optical fiber element is preferably coated with a removable permanent or semi-permanent coating to protect it from the environment. If necessary, the coating is removed from a single predetermined section of an optical fiber, from multiple sections, or from its entire length by at least one of mechanical, chemical, or thermal coating removal techniques. Complete removal of the coating in the section is preferred, but it is only necessary to sufficiently remove the coating such that the optical radiation may access the optical fiber core in the section to form the Bragg grating therein.

In step (b), the predetermined section of the optical fiber where the Bragg grating is to be formed is immobilized, e.g. fixed with respect to a source of optical radiation, so that the grating writing process may proceed in that section with the desired degree of precision. The section to be processed may be immobilized in any known manner, but gripping the fiber adjacent a first end of the section and adjacent a second end of the section with a mechanical clamping device is preferred. If desired, the clamping devices may be used to apply longitudinal stress to the fiber during grating writing (step (c)) to fine-tune the wavelength of the Bragg grating formed in the processed optical fiber section and continuously monitor its quality, or may include optional means for rotationally orienting the fiber prior to or during grating formation.

In step (c), optical radiation, preferably emitted from a coherent source such as laser, is directed into the section of the optical fiber to be processed. A single Bragg grating or multiple Bragg gratings may then be formed in the core of the predetermined section of the optical fiber using phase mask projection, holography, or a combination thereof. The fiber may optionally be annealed following step (c) to improve the stability of the Bragg grating.

In step (d), at least the processed section of the optical fiber which contains the Bragg grating, or the entire optical fiber element, is covered as required for its end use application. The covering may vary widely depending on the intended application, and may include application of temporary or permanent sleeves, or application of mechanical devices such as connectors. However, the processed section containing the Bragg grating, or the entire optical element, is typically recoated with a protective coating to protect the optical fiber and Bragg grating in the processed section from the environment, and to preserve the strength of the optical fiber element. The application of this coating also allows an opportunity to identify the location of the Bragg grating formed. For example, to identify the location of the Bragg grating along a length of optical fiber, the processed section may be recoated with a coating having a different color than the coating on the non-processed portion of the fiber. In the alternative, the processed section may be recoated with a clear coating, or an identifying mark, such as, for example, a bar code, may be applied.

In another embodiment, a coating may be applied to the optical fiber element which is sufficiently transparent to the optical radiation at the grating writing wavelength such that no coating removal step is required. In this embodiment, the process of the present invention comprises the following steps:

(a) fixing at least one predetermined section of the element with respect to a source of optical radiation; and (b) directing optical radiation from the source through the coating to produce at least one Bragg grating in the at least one section. If necessary, the optical fiber may then be further processed to protect its optical and physical properties.

The present invention also extends to an apparatus for carrying out the process steps described above. The apparatus of the present invention will typically be provided as a process line with a coating removal station, a fiber immobilization and Bragg grating writing station, and a packaging station. The apparatus or the stations thereof may optionally be supplied in modular form.

DETAILED DESCRIPTION OF THE INVENTION

The process of the present invention is typically used to manufacture Bragg gratings from plastic or glass, preferably silica-based glass, bare optical fibers which have been drawn and coated on a draw tower with at least one protective coating to form an optical fiber element. As is well known in the art, optical fiber elements generally comprise of a bare fiber(s), and one or more buffer layers around the bare fiber to protect the optical fiber from microbending losses and abrasion (see, for example, Sterling, *Technician's Guide to Fiber Optics*, (1993), at page 73). In the present application, the term "bare fiber" or "optical fiber" refers to a section of the fiber optic element from which the buffer and external strength members have been removed. If a non-strippable protective layer lies beneath the buffer, the protective layer is considered part of the bare fiber.

Figure 1:
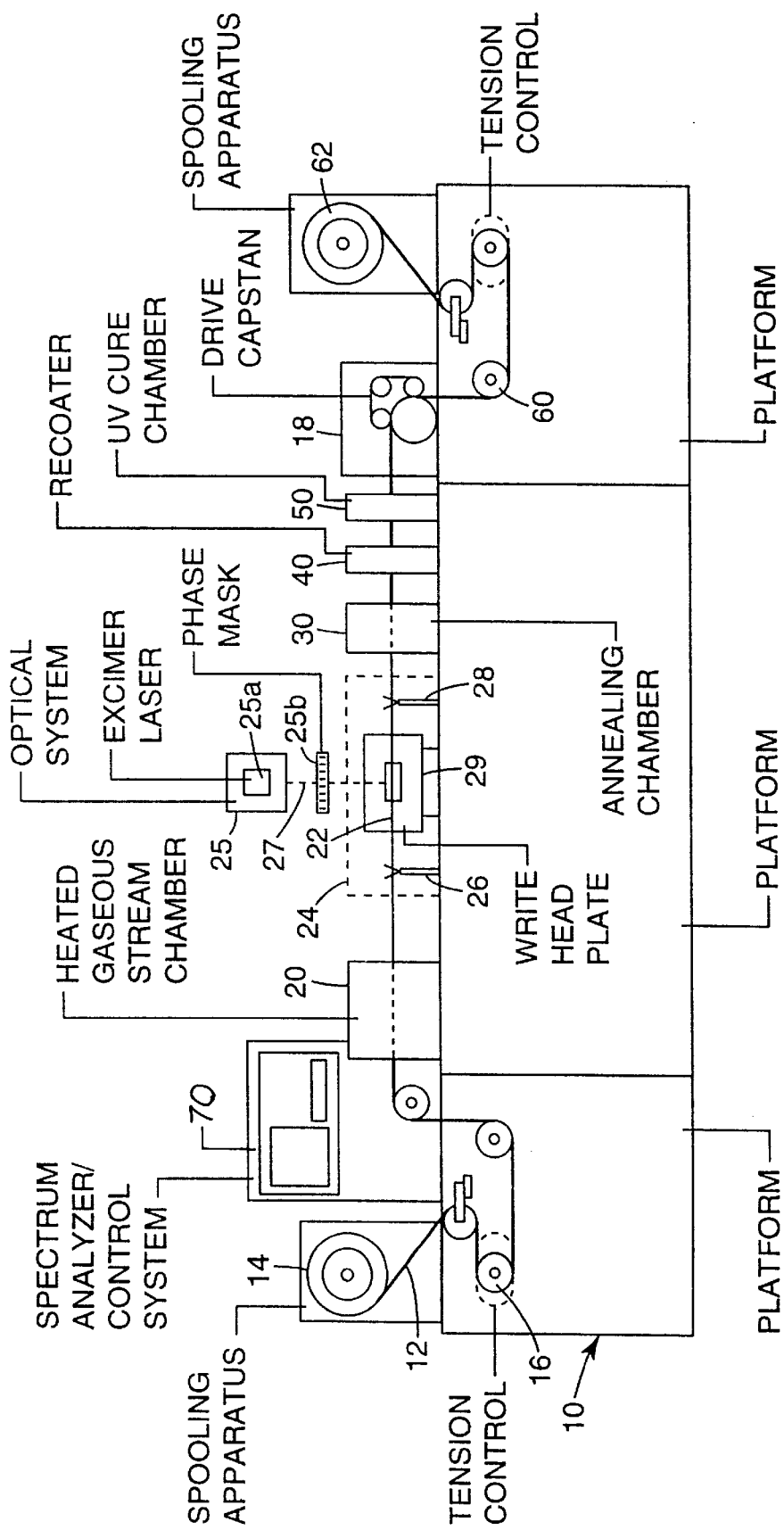
FIG. 1 is a schematic diagram of an apparatus for continuous or stepwise continuous processing of optical fiber elements according to the process of the present invention.

Referring to an apparatus 10 schematically illustrated in FIG. 1, the optical fiber elements 12 which may be incorporated into the process of the present invention are typically stored wound on spools. The optical fiber elements 12 used in the apparatus and process of the present invention are provided with at least one coating. In the process of the present invention, the coatings are applied to a bare optical fiber, or a bare optical fiber with a non-strippable protective layer, and do not include the strength members or the jacket which make up the outer layers of an optical fiber cable.

As is well known in the art, the coatings which are applied to the bare fiber at the draw tower will vary widely depending on the fiber's intended end use application. The coatings are typically selected to protect the delicate optical fiber structure from mechanical and/or environmental damage. Optionally, a coating may be applied to the bare fiber which is also sufficiently transparent to a particular wavelength of optical radiation such that the selected wavelength may be directed through the coating to form a Bragg grating. Such a coating will be referred to herein as a transparent coating. However, other design considerations may require that a coating be selected which is not transparent to the wavelength of optical radiation used to form the Bragg grating in the optical fiber core. If the coating material on the optical fiber element 12 is not substantially transparent to the wavelength of optical radiation used to write the Bragg grating, it is necessary that the coating be sufficiently removed to allow the selected wavelength to access the optical fiber core. The non-transparent coatings may comprise any material substantially completely removable by at least one of a mechanical, chemical or thermal technique. Such coatings will be referred to herein as removable coatings.

Figure 3:
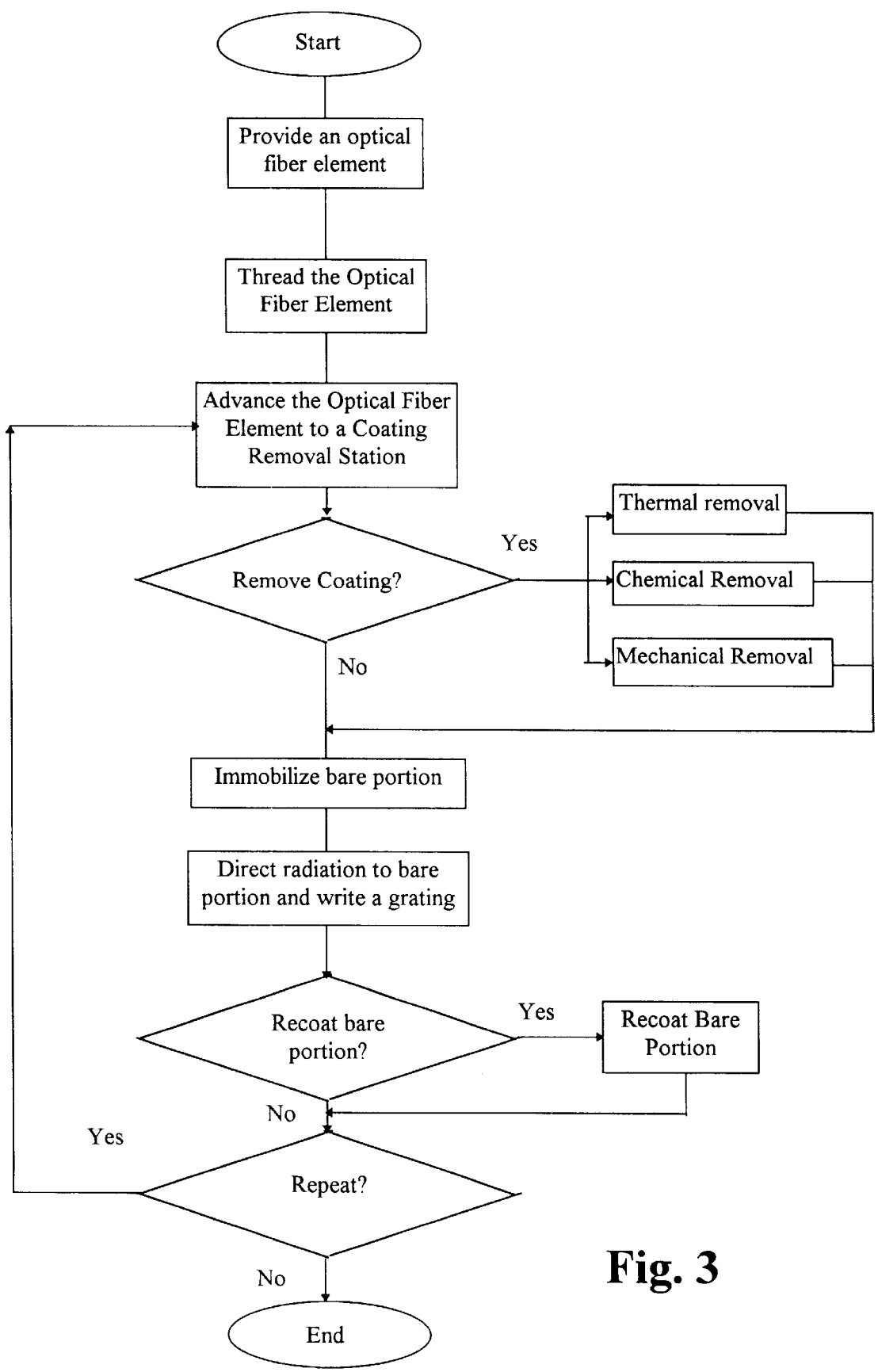
FIG. 3 is a flow chart detailing an exemplary method for manufacturing a Bragg grating assembly in accordance with the present invention.

FIG. 3 shows a flow chart detailing the steps of an exemplary method for manufacturing a Bragg grating assembly in accordance with the present invention. In the apparatus and process of the present invention, the optical fiber element 12, or a specified length thereof, is unwound from a tension controlled payoff spool 14. The payoff spool 14 may include an optional rotational optical coupler (not shown) to provide real-time information regarding the Bragg grating writing process. The optical element 12 is pulled through a series of alignment pulleys 16 by a drive capstan apparatus 18 to an optional coating removal station 20. Of course, if a coating is applied to the optical fiber element 12 which is substantially transparent to the wavelength of the optical radiation to be used to write the Bragg grating in the optical fiber core, no coating removal step is required in the process of the present invention. However, the apparatus and process of the present invention will be further described below assuming that a removable coating is applied to the optical fiber which is not transparent to the wavelength of the optical radiation to be used to write the Bragg grating in the optical fiber.

In the coating removal station 20 it is necessary that a sufficient portion of the coating be removed from a predetermined section of the optical fiber element such that optical radiation may access the optical fiber core to form a Bragg grating therein. The predetermined section of the optical fiber may comprise the entire length of the optical fiber element, or any length less than the entire length.

As noted above, the removable coating may be substantially removed from the optical fiber in the coating station 20 by any of mechanical, chemical, or thermal means, or combinations thereof Regardless which method of coating removal is employed in the coating removal station 20, it is important to select a removable coating for use in the apparatus and process of the present invention that may be substantially completely removed from the optical fiber to permit subsequent processing with optical radiation to form a Bragg grating in the optical fiber core. In the coating removal station 20, the removable coating is preferably completely removed, but partial removal of the coating may also be used if such removal is sufficient to permit subsequent processing. However, any residue which remains in contact with the bare fiber surface following incomplete removal of a coating, particularly carbonaceous residue following incomplete thermal removal, creates a local stress concentration, which may significantly degrade the tensile strength of the optical fiber. In addition, the small flakes which remain on the surface of the optical fiber following incomplete coating removal may block optical radiation and interfere with subsequent processing steps.

For the purposes of the present application, the term substantially complete removal applies to any polymeric coating which, following removal, has a residuum of less than about 10% by weight, preferably less than about 5% by weight, based on the initial coating weight. Coatings which may be used in the process of the invention may be identified with a wide variety of analytical techniques, such as thermogravimetric analysis (TGA).

To be useful in the process of the present invention, which is preferably continuous or stepwise continuous, the substantially complete removal of the coating should be completed in a commercially feasible time, which for the purposes of the present application, is less than about 15 seconds, preferably less than about 10 seconds, and most preferably less than about 1 second. The thickness of the removable coating or coatings used in the process of the present invention may vary widely depending on the intended application, but a conventional coating thickness of about $15\mu$ to about $35\mu$ is normally used.

The substantially complete coating removal referred to above is preferably accomplished such that fiber tensile strength is not reduced below a predetermined level required for a particular end use application. For the purposes of the present invention, the tensile strength of the optical fiber is measured by evaluation of the median fracture stress according to ANSI/EIA/TIA-455-28B-1991, which will be referred to herein as FOTP-28. Preferably, in the process of the present invention the median fracture stress of the optical fiber following coating removal should not be reduced more than about 50%, based on the initial median fracture stress of the optical fiber prior to coating removal.

However, optical fiber strength testing is statistical in nature, and many individual fibers, each of which is representative of a given population, must be tested for strength. The result is reported for the population as a whole as a strength distribution, and this distribution is characterized by slope, m, (also referred to as the Weibull modulus) of the well-known Weibull plot. In the present process, the Weibull modulus is a measure of the homogeneity of fiber strength retained following coating removal. The strength distribution of the fiber following coating removal is preferably narrow, as evidenced by a sufficiently high Weibull modulus or slope, m, for an intended application as measured by FOTP28.

A large m in excess of about 100 corresponds to a uniform or narrow strength distribution, and suggests that a characteristic fracture stress exists for the fiber and that the probability of failure does not become significant until the applied tensile stress approaches that characteristic value. On the other hand, a low Weibull modulus of less than about 20 suggests that the probability of failure is significant at almost any applied stress, and is indicative of low mechanical reliability. Preferably, the thermal removal of the coating must reduce the initial (e.g., prior to thermal coating removal) Weibull modulus not more than about 50%.

In the coating removal station 20, the removable coating may be removed by any conventional means from the entire optical fiber or from a section of predetermined length. For example, the removable coating may be mechanically "stripped" from the bare fiber with a knife or similar tool. The removable coating may be chemically removed by soaking in an appropriate solution. Many different chemical solutions may be used, and concentrated sulfuric acid or a combination of sulfuric acid and hydrogen peroxide are typical examples. In the alternative, a combination of chemical and mechanical coating removal techniques may be used. For example, the removable coating may be soaked in a solvent, such as acetone, to swell the coating, and then the swelled coating may be mechanically stripped from the fiber. In the alternative, heat may be applied to the optical fiber by any conventional means to deteriorate or burn away the coating.

However, mechanical stripping with a knife or tool may cause scratches on the glass fiber surface, which ultimately lead to fine cracks and decreased fiber strength. Chemical stripping techniques often leave a residue on the fiber surface which reduces fiber strength and interferes with subsequent processing steps. If heat is applied to remove the coating, the charred residue which results reduces fiber strength and may require additional coating removal steps prior to processing. In addition, the optical fiber absorbs heat during coating pyrolysis, which may result in fiber embrittlement. While any coating removal procedure may be employed in the apparatus and process of the present invention, thermal removal is presently preferred because it is believed to have the least deleterious effect on the strength of the optical fiber. See copending U.S. application Ser. No. 08/631,491, which is incorporated herein by reference.

The removable coatings which are preferred for use in the apparatus and process of the present invention are described in copending U.S. application Ser. No. 08/631,491 which is hereby incorporated be reference. Following thermal removal in the commercially feasible time referred to above, the preferred removable coatings will have a residuum of less than about 10% by weight, preferably less than about 5% by weight, based on the initial coating weight, after thermal treatment in air at about 300° C. to about 900° C., preferably about 400° C. to about 700° C., most preferably about 500° C. to about 600° C. The thermal removal of the preferred removable coating should preferably reduce the initial median fracture stress not more than about 50%, preferably not more than about 25%, and most preferably not more than about 15%. The preferred removable coatings used in the process of the present invention should reduce the initial (e.g., prior to coating removal) Weibull modulus of the optical fiber not more than about 50%, preferably not more than about 25%, and most preferably not more than about 15%.

The optical fiber fracture stress following removable coating removal is sensitive to the amount of heat applied to the fiber. Therefore, it is important in the process of the invention that heat be applied in the coating removal station 20 such that a minimum of thermal energy is transferred to the optical fiber. The heat may be applied to thermally remove the removable coating in any appropriate manner which preserves sufficient optical fiber strength for a particular end use application, such as, for example, with a heated resistance filament or other radiant type heat source, a $CO_2$ laser or a heated gaseous stream. Thermal removal of the removable coating in the coating removal station 20 is preferably performed using a heated gaseous stream. While not wishing to be bound by any theory, the heated gaseous stream is believed to depolymerize the removable coating material and sweep away the volatilized product with minimum transfer of heat to the optical fiber. The gaseous stream may comprise any gas or mixture of gases, including air, nitrogen, argon, and the like, and nitrogen is preferred for its inert properties and availability. Gas mixtures containing oxygen are less desirable for use in the process of the present invention, since the heat of combustion generated during thermo-oxidative processes increases the temperature of the optical fiber glass and degrades its strength characteristics.

The gaseous stream may be applied by any suitable technique, such as with an air gun or an air knife. However, an air knife is preferred for a commercially feasible continuous or stepwise continuous process for preferential removal of a predetermined length of removable coating from a section of optical fiber. The tensile strength of the fiber following removable coating removal may be optimized by using a heat source, fixed at a desired distance, at the appropriate temperature to remove the removable coating. Of course, the parameters will vary widely depending on the coating selected, coating thickness, the processing time, gas flow rate, and gas temperature. For example, a resistance wire coiled in a circular tube with a restricted output placed about 2 to about 10 mm from the surface of the coating, preferably about 5 mm, with a gas flow rate of about 1 to about 3 scfm, and a gas stream temperature from about 400° C. to about 900° C., preferably about 600° C. to about 700° C., has been found effective for suitable thermal removal of the removable coating.

Following the coating removal step, a section 22 of the optical fiber from which the coating has been substantially completely removed enters a fiber immobilization and grating writing station 24. The station 24 includes means for fixing the section 22 of the optical fiber with respect to a source of optical radiation, and means for applying the optical radiation to the section 22 to form a Bragg grating at a predetermined wavelength or Bragg condition in the optical fiber core of the section 22.

Any means for immobilizing the section 22 may be used which holds the optical fiber element 12 sufficiently stationary such that a Bragg grating may be written in the core of the optical fiber in the section 22 with a desired Bragg condition. A presently preferred means for immobilizing the section 22 to be processed comprises a first tensioning clamp 26 and a stage clamp 28. The clamps 26 and 28 mechanically grip a first end and a second end, respectively, of the section 22. To prevent damage to the optical fiber, it is preferred that the clamps 26 and 28 engage coated portions of the optical fiber element adjacent the bare fiber in the section 22.

The clamps 26 and 28 may simply hold the section 22 taut and firmly in place while the grating is written in the optical fiber, or may be used to apply a predetermined longitudinal strain to the optical fiber section 22 to produce a predetermined Bragg condition in the section 22. It is well known in the art that strain may be applied to an optical fiber during the Bragg grating writing process to tune the Bragg condition of the grating, such as the resonant frequency. Typically, the strain applied to the fiber is limited by its mechanical strength, and the resulting elongation should not exceed about 10% of the original (pre-stretched) length of the fiber. The preferred elongation is less than about 7%, most preferably less than about 5%. See, for example, U.S. Pat. No. 5,384,884 to Kashyap et al.; Byron and Rourke, *Fabrication of Chirped Fibre Gratings by Novel Stretch and Write Technique*, Electronics Letters, vol. 1, no. 31 (January 1995); and Zhang et al., *Tuning Bragg Wavelength by Writing Gratings on Prestrained Fibers*, Photonics Technology Letters, vol. 6, no. 7 (July 1994).

Application of longitudinal strain may also be used to multiplex gratings along the length of the optical fiber. Since "downstream" gratings in sections of the optical fiber which are not in tension pass the wavelength of light necessary to monitor the grating in the section under tension, periodic stretching of the optical fiber may be used to monitor in real time the accuracy of the grating writing process. See U.S. Pat. No. 5,384,884 to Kashyap et al.; Campbell & Kashyap, *Spectral Profile and Multiplexing of Bragg Gratings in Photosensitive Fiber*, Optics Letters, vol. 16, no. 12 (June 1991).

The longitudinal strain applied to the section 22 may be varied by adjusting the tensioning clamp 26. The tensioning clamp may comprise any mechanical means (not shown in FIG. 1) for applying a continuously variable strain to the section 22, for example, a clamped micrometer, a piezoelectric translation stage, or a simple weight. A means for continuously monitoring the strain, such as, for example, a strain gauge with closed loop control of the tensioning clamp 26, may be incorporated in the apparatus to assist in the automation of the Bragg grating write process. The stage clamp 28 will typically be a simple clamp only, but may also be capable of applying varying levels of strain to the section 22. Optionally, the tensioning clamp 26 and the stage clamp 28 may include means for rotating the optical fiber section 22 about its longitudinal axis. For example, this rotational capability may be used to provide an appropriate Bragg grating synthesis. The rotation means may also be used to produce a Bragg grating having a predetermined orientation with respect to an internal polarization axis of a polarizing or polarization-maintaining optical fiber element. For example, to determine the rotational orientation of a polarizing or polarization-maintaining optical fiber with respect to some external reference direction, the optical alignment imaging system and rotatable clamp mechanism described in U.S. Pat. No. 5,013,345 may be used.

Once the section 22 of the optical fiber to be processed has been immobilized, optical radiation may be applied to the section 22 in the immobilization and grating writing station 24 to produce one or more Bragg gratings in the optical fiber core of the section 22. The Bragg grating may be produced in the optical fiber section 22 by any method and any optical system 25 known in the art, such as, for example, by phase mask projection or holography. See, for example, Farries et al., *Fabrication and Performance of Packaged Fiber Gratings for Telecommunications*, and Rizvi et al., *Production of Bragg Gratings in Optical Fibers by Holographic and Mask Projection Methods*, Institution of Electrical Engineers, Optical Fiber Gratings and Their Applications, January 1995.

The presently preferred method for processing the section 22 to form a Bragg grating is shown schematically in FIG. 1. In this technique coherent optical radiation 27 from an excimer laser 25a is directed through a phase mask 25b and enters the core of the optical fiber in the section 22 in a direction generally normal to the length of the section 22. Preferably, the distance and orientation of the section 22 with respect to the phase mask 25b is precisely maintained by an arrangement of machined grooves (not shown) in a write head plate 29.

Following writing of the Bragg grating in section 22 of the optical fiber, the processed section 22 is transported into an optional annealing unit 30. As is well known in the art, annealing of an optical fiber Bragg grating ensures that the optical properties of the grating will remain constant over an extended period of time. See Erdrogan et al., *Decay of Ultraviolet-Induced Fiber Bragg Gratings*, J.Appl.Phys, vol. 76, July 1994, at 73. The annealing is typically performed by passing the optical fiber section 22 which contains the Bragg grating through a heated chamber or zone (not shown). In the heated chamber, radiant or forced air heat is applied for a period of time inversely proportional to the applied temperature to anneal the section 22 of the optical fiber. The required annealing time will vary depending on the characteristics of the optical fiber element and the desired end use application, but, typically, a one minute dwell in the heating zone at about 300° C. is sufficient.

Following the optional annealing step, the processed section 22 is transported into a packaging unit 40. In the packaging unit 40, the section 22 of optical fiber in which the Bragg grating is written is covered or packaged for its particular end use application. For example, in the packaging section 40 the section 22 may be recoated with a temporary or permanent coating, temporary or permanent rigid or flexible sleeves may be attached, or mechanical devices such as connectors may be affixed to cover the section 22. Preferably, in the packaging section 40 the processed section 22 which contains the Bragg grating, or the entire optical fiber element 12, is recoated with any conventional temporary or permanent protective coating.

If the original removable coating provided on the optical fiber element 12 is in place along the entire fiber length with the exception of the bare section 22, to identify the location of the Bragg grating(s) along the fiber length the entire optical fiber element 12, including the section 22, may be re-coated with a material that is visually distinguishable from the original removable coating. For example, if the original removable coating is colored, the recoat material applied in the packaging section 40 may be clear, or vice-versa. In the alternative, the recoat material applied in the packaging section 40 may have a different thickness or texture than the original removable coating. In addition to or instead of the recoat color identifier, the position of the Bragg grating in the section 22 may be identified by applying human readable or machine readable indicia to the recoated section 22. Examples may include a bar code, colored bars, machine readable characters, or any combination thereof.

Following packaging, the recoated section 22 may be transported to an optional cure unit 50 if necessary to cure the coating and/or indicia applied in the recoat unit. The cure may be performed by any appropriate method known in the art.

Following the curing step, the completed optical fiber element with at least one Bragg grating written therein is routed through a series of alignment pulleys 60 and re-wound on a take-up spool 62 for storage or subsequent processing.

While the apparatus and process of the present invention have been described with respect to formation of a single optical fiber Bragg grating in a single predetermined section 22 of the optical fiber element 12, it should be apparent to those of ordinary skill in the art that the present apparatus and process may also be used to form multiple Bragg gratings in a single predetermined section of the optical fiber element, or, individual Bragg gratings in multiple sections of a single optical fiber element, without splicing.

For example, if the removable coating were removed from a first section of an optical fiber element in the coating removal station 20 of the apparatus shown in FIG. 1, the first section could subsequently be advanced to the immobilization and grating writing station 24 as shown in FIG. 1. While the first section is treated with the laser in the immobilization and grating writing section to produce individual or multiple Bragg gratings therein, the removable coating is removed from a second section of the optical fiber element in the coating removal station. When the first section is advanced to the annealing station 30, the second section may be advanced into the immobilization/writing station 24 to produce individual or multiple gratings therein, and a third section may then be treated in the coating removal station 20, and so on.

Figure 2A:
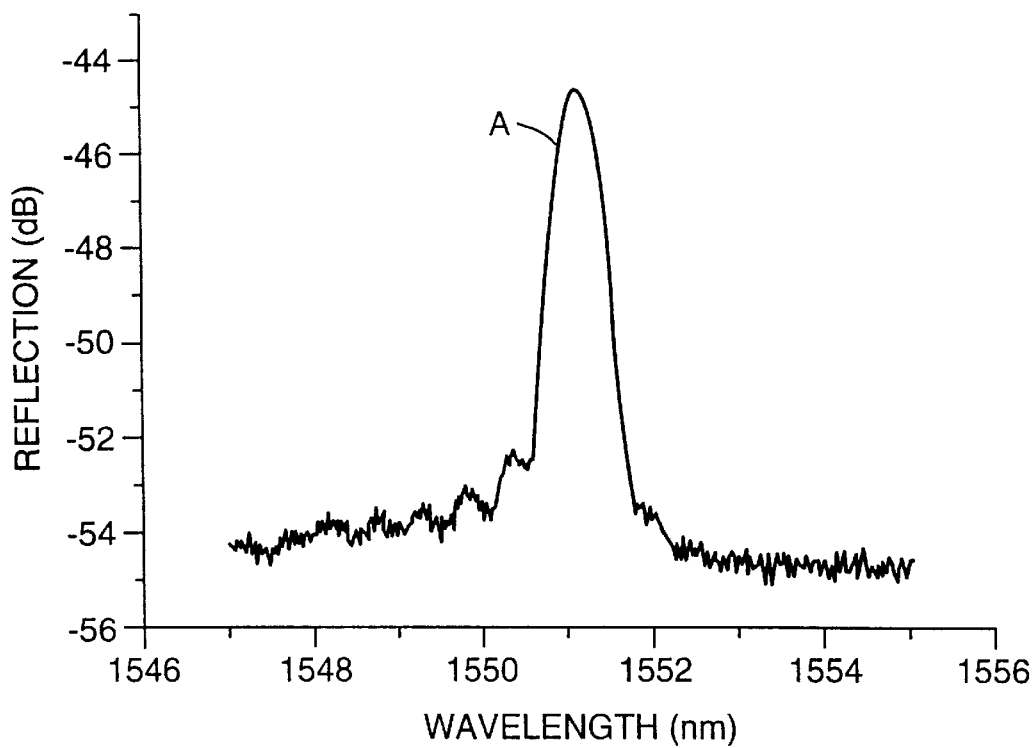
FIG. 2A is a spectrum analyzer plot of reflection vs. wavelength for a Bragg grating array produced according to the process of the present invention.
Figure 2B:
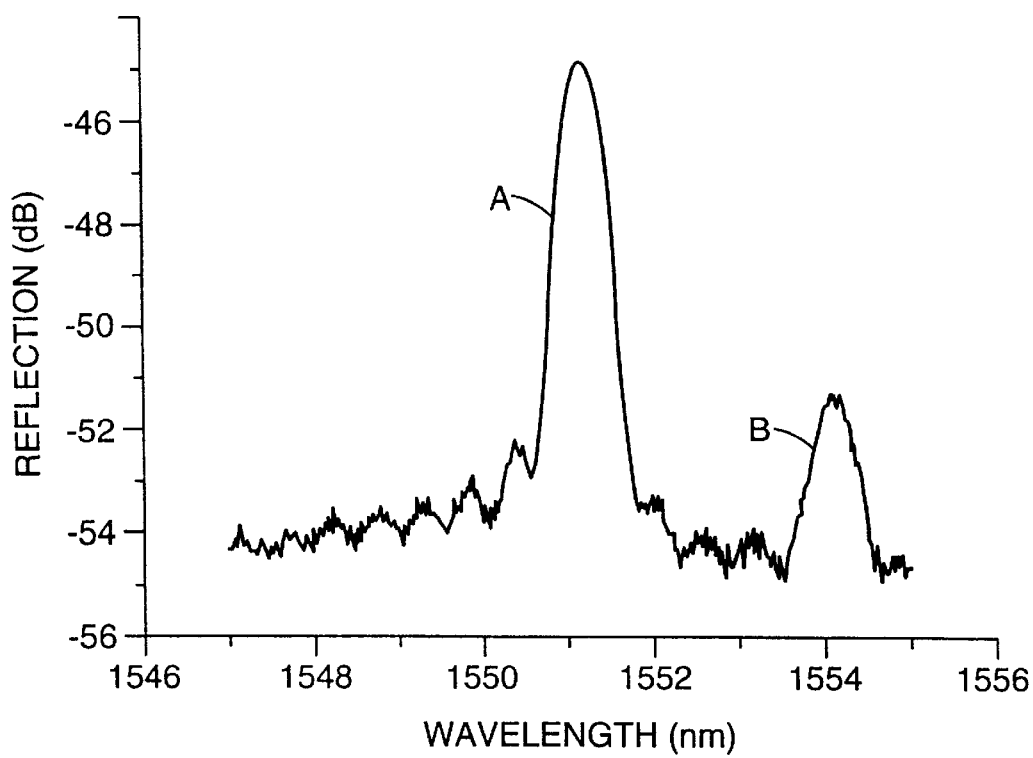
FIG. 2B is a spectrum analyzer plot of reflection vs. wavelength for the Bragg grating array of FIG. 2A with one grating in the array placed under longitudinal strain.

When such a procedure is used to produce multiple gratings in a single optical fiber, strain may be applied to the section in the immobilization/writing station to continuously real time monitor its characteristics during formation. For example, FIG. 2A is a spectrum analyzer 70, illustrated in FIG. 1, plot of reflection vs. wavelength for a series of 15 individual gratings written on 1.2 meter centers in a single optical fiber element to form a grating array using the process of the present invention. The center wavelength of the Bragg gratings in the array (see peak A in FIG. 2A) is about 1551 nm. In FIG. 2B, the fifteenth grating in the array was placed under longitudinal strain, and its center wavelength was observed to shift to about 1554 nm (see peak B in FIG. 2A). The center wavelength of the fourteen non-strained gratings in the array was observed to remain constant at about 1551 nm (see peak A in FIG. 2B), which demonstrates the uniformity of the characteristics of the gratings in the array.

It will be understood that the exemplary embodiments described herein in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of the specific elements, dimensions, materials or configurations contained therein. All alternative modifications and variations which fall within the spirit and scope of the appended claims are included in the present invention.

What is claimed is:

1. A continuous process of manufacturing a plurality of optical fiber Bragg gratings, which comprises the following steps:

(a) pulling a continuous length of a coated optical fiber having a thermally removable coating into an apparatus comprising a coating removal station, a grating writing station and a recoating station sequentially arranged in a process line;

(b) advancing the continuous length of the coated optical fiber through the apparatus until a first section of the coated optical fiber is in the coating removal station and exposing the first section to a heated gaseous stream to remove the thermally removable coating therefrom;

(c) advancing the optical fiber through the apparatus until the first section is in the grating writing station and a second section is in the coating removal station, wherein (i) in the grating writing station, gripping a first end of the first section and a second end of the first section to immobilize the first section, and directing optical radiation into the optical fiber and writing at least one Bragg grating in the first section, and, (ii) in the coating removal station, exposing the second section to a heated gaseous stream to remove the thermally removable coating therefrom;

(d) advancing the optical fiber through the apparatus until the first section is in the recoating station, the second section is in the grating writing station, and a third section is in the coating removal station, wherein (i) in the recoating station, recoating the first section with a second coating different from the thermally removable coating, and (ii) in the grating writing station, gripping a first end of the second section and a second end of the second section to immobilize the second section, and directing optical radiation into the optical fiber and writing at least one Bragg grating in the second section, and, (iii) in the coating removal station, exposing the third section to a heated gaseous stream to remove the thermally removable coating therefrom; and (e) continuously advancing the optical fiber through the apparatus until a desired number of Bragg gratings are written in the optical fiber.

2. An in-line continuous process of manufacturing a plurality of Bragg gratings, which comprises the following steps:

(a) providing a continuous length of coated optical fiber having a thermally removable coating;

(b) positioning a section of the continuous length of optical fiber at a coating removal station and thermally removing at least a portion of the thermally removable coating in the section of the continuous length of optical fiber to expose a generally bare portion of the optical fiber in the section;

(c) positioning the section of the continuous length of optical fiber element in a writing station and immobilizing the bare portion of optical fiber with respect to a source of radiation;

(d) directing radiation from the source into the bare portion of optical fiber and writing at least one Bragg grating;

(e) positioning the section of the continuous length of optical fiber at a recoating station and recoating the bare portion of optical fiber; and (f) repeating steps (b)–(e) sequentially along different sections of the length of optical fiber as necessary to write a number of Bragg gratings in the optical fiber, wherein the different sections of the length of optical fiber are each positioned at one of the different stations.

3. An in-line continuous process of manufacturing a Bragg grating in an optical fiber, which comprises the following steps:
  (a) providing a continuous length of optical fiber;
  (b) positioning the length of optical fiber in a continuous process line, wherein the continuous length of optical fiber advances past a source of radiation;
  (c) fixing at least one section of the optical fiber with respect to the source of radiation;
  (d) directing radiation from the source into the optical fiber and writing at least one Bragg grating in the at least one section; and
  (e) advancing a new section of the continuous length of optical fiber past the source of radiation and repeating steps (c) to (d).

4. A continuous process of manufacturing a plurality of optical fiber Bragg gratings comprising the steps of:
  providing a length of a coated optical fiber having a thermally removable coating;
  pulling the optical fiber in an in-line continuous grating writing apparatus, the apparatus including a payoff spool, a coating removal station, a grating writing station, a recoating station, and a take-up spool, wherein the optical fiber is stored in the payoff spool, advances sequentially past the coating removal station, the grating writing station, and the recoating station, and is spooled into the take-up spool;
  advancing the coated optical fiber through the apparatus until a first section of the coated optical fiber is in the coating removal station;
  exposing the first section to a heated gaseous stream to remove the thermally removable coating therefrom;
  advancing the bare optical fiber through the apparatus until the first section is in the grating writing station;
  writing at least one grating on the bare optical fiber in the first section;
  advancing the bare optical fiber through the apparatus until the first section is in the recoating station;
  applying a coating to the first section; and
  spooling the first section into the take-up spool.

5. The process of claim 4, wherein the steps of advancing the optical fiber comprise spooling the optical fiber into the take-up spool in a step-wise motion.

6. A continuous process for manufacturing a plurality of optical fiber Bragg gratings which comprises the following steps:
  (a) providing a continuous length of a coated optical fiber having a thermally removable coating;
  (b) positioning the length of optical fiber in an in-line apparatus including a coating removal station and a grating writing station;
  (c) positioning a section of the length of the coated optical fiber at the coating removal station and thermally removing at least a portion of the thermally removable coating in the section to expose a generally bare portion of optical fiber in the section;
  (d) positioning the bare portion of optical fiber at the writing station and immobilizing the bare portion of optical fiber with respect to a source of radiation;
  (e) directing radiation from the source into the bare portion of optical fiber and writing at least one Bragg grating in the bare portion of optical fiber; and
  (f) recoating the bare portion of optical fiber,
  wherein the steps of positioning the optical fiber comprise spooling the optical fiber element in a step-wise motion.

* * * * *